United States Patent
Zhou et al.

(10) Patent No.: US 6,632,560 B1
(45) Date of Patent: Oct. 14, 2003

(54) RETENTION FRAME FOR A BATTERY PACK

(76) Inventors: Shijian Zhou, 5828 Pheasant Ct., Carmel, IN (US) 46033; Jeffrey C. Waters, 1246 Dori La., Indianapolis, IN (US) 46260; David R. Price, 9441 Timbervalley, Indianapolis, IN (US) 46250

( * ) Notice: Subject to any disclaimer, the term of this patent is extended or adjusted under 35 U.S.C. 154(b) by 306 days.

(21) Appl. No.: 09/771,057

(22) Filed: Jan. 29, 2001

(51) Int. Cl.[7] .......................... B60R 16/04; H01M 2/10; H01M 6/42

(52) U.S. Cl. .............. 429/99; 429/9; 429/100; 429/148; 429/154; 180/68.5

(58) Field of Search .................. 429/9, 96–100, 429/148, 153, 151, 154, 155; 180/68.5

(56) References Cited

U.S. PATENT DOCUMENTS

| | | | |
|---|---|---|---|
| 5,304,434 A | * | 4/1994 | Stone .......................... 429/99 |
| 5,534,364 A | * | 7/1996 | Watanabe et al. ............. 429/61 |
| 5,639,571 A | * | 6/1997 | Waters et al. .................. 429/71 |
| 5,736,272 A | * | 4/1998 | Veenstra et al. ............... 429/99 |
| 6,189,635 B1 | * | 2/2001 | Schuler et al. ............. 180/68.5 |
| 6,406,812 B1 | * | 6/2002 | Dreulle et al. ................. 429/99 |

* cited by examiner

Primary Examiner—Stephen Kalafut
Assistant Examiner—Tracy Dove
(74) Attorney, Agent, or Firm—Christopher DeVries

(57) ABSTRACT

A battery pack for an electric/hybrid vehicle that includes a plurality of batteries stacked in layers one atop the other and electrically coupled together to provide the necessary power to the vehicle. The plurality of batteries is supported on an underlying base. A plurality of spacers are disposed above and below each layer for separating the layers of batteries and providing air passages around the batteries to allow air flow around the batteries to provide heating or cooling of the batteries. A retention frame affixes the batteries to the base to restrict movement of the batteries. The frame includes a plurality of beams that are interconnected and extend along the ends of the batteries. The beams apply a vertical force against the batteries, thereby fixing them rigidly to the base.

5 Claims, 4 Drawing Sheets

RETENTION FRAME FOR A BATTERY PACK

TECHNICAL FIELD

This invention generally relates to battery packs for electric/hybrid vehicles and, more particularly, to a retention frame for a battery pack that reduces the relative motion between batteries within the pack.

BACKGROUND OF THE INVENTION

It is well known in the art relating to battery packs for electric/hybrid vehicles to provide a structure for securing a plurality of batteries within the battery pack. Electric vehicles require a battery pack having both high voltage and large current capacity. To provide the necessary voltage and current capacity to drive the vehicle, the battery packs generally include a number of individual batteries electrically coupled together. Usually, the batteries are held in place by a compressive force applied to their top surfaces. Some battery pack designs arrange the batteries on an underlying support or tray and hold down the batteries on the support by means of a cover that applies the compressive force to the top surfaces of the batteries and is secured to the underlying support.

Over time, the force applied to the tops of the batteries tends to relax or decrease. As this force is reduced, the batteries become more susceptible to relative shifting which leads to less than optimal performance over time. There is a need for a battery pack configuration that reduces the relative motion between the batteries which results in increased life and reliability of the electrical connections between the batteries.

SUMMARY OF THE INVENTION

The present invention provides a battery pack for an electric/hybrid vehicle. The pack includes a plurality of batteries stacked in layers one atop the other. The plurality of batteries is supported on a base. Spacers are disposed above and below each layer of batteries. The spacers hold the batteries in place and also provide air passages around the batteries. The air passages allow air to flow around the batteries to provide heating or cooling of the batteries. A retention frame affixes the batteries to the base to prevent relative movement between the batteries. The frame includes a plurality of beams that are interconnected and extend along ends of the batteries. The beams apply a vertical force against the batteries, thereby holding them down in place. By restricting the movement, it is less likely that the electrical connections between the batteries are disrupted.

In one embodiment of the invention, each battery includes an end bracket mounted on each end of the battery. The beams are arranged such that they are located over the end brackets of the batteries when the batteries are arranged in rows. The beams are secured to the end brackets by aligning holes in the beams with holes in the end brackets and placing fastening elements such as bolts or screws through both holes.

The frame includes a layer of beams for each layer of batteries. The layers are secured to together by fastening elements such as bolts or screws that extend between each layer. A bottom layer of the beams is secured to the base. Thus, the configuration of the frame applies a vertical force against the end brackets of the batteries, thereby holding the batteries down in place.

The spacers provided above and below the layers of batteries are divided into sections that form the rows in which the batteries are placed. Each section includes end walls and side walls which may be shared with an adjacent section. A horizontally disposed edge portion extends outwardly from the walls within each section. The bottom edges of the batteries are seated against the edge portion when the spacer is located beneath the batteries and the edge portion rests upon the top edges of the batteries when the spacer is located above the batteries, thereby creating air passages above and beneath the batteries. Also, a sheet of material is placed between the spacers to create air passages.

These and other features and advantages of the invention will be more fully understood from the following description of certain specific embodiments of the invention taken together with the accompanying drawings.

DESCRIPTION OF THE PREFERRED EMBODIMENT

Figure 1:
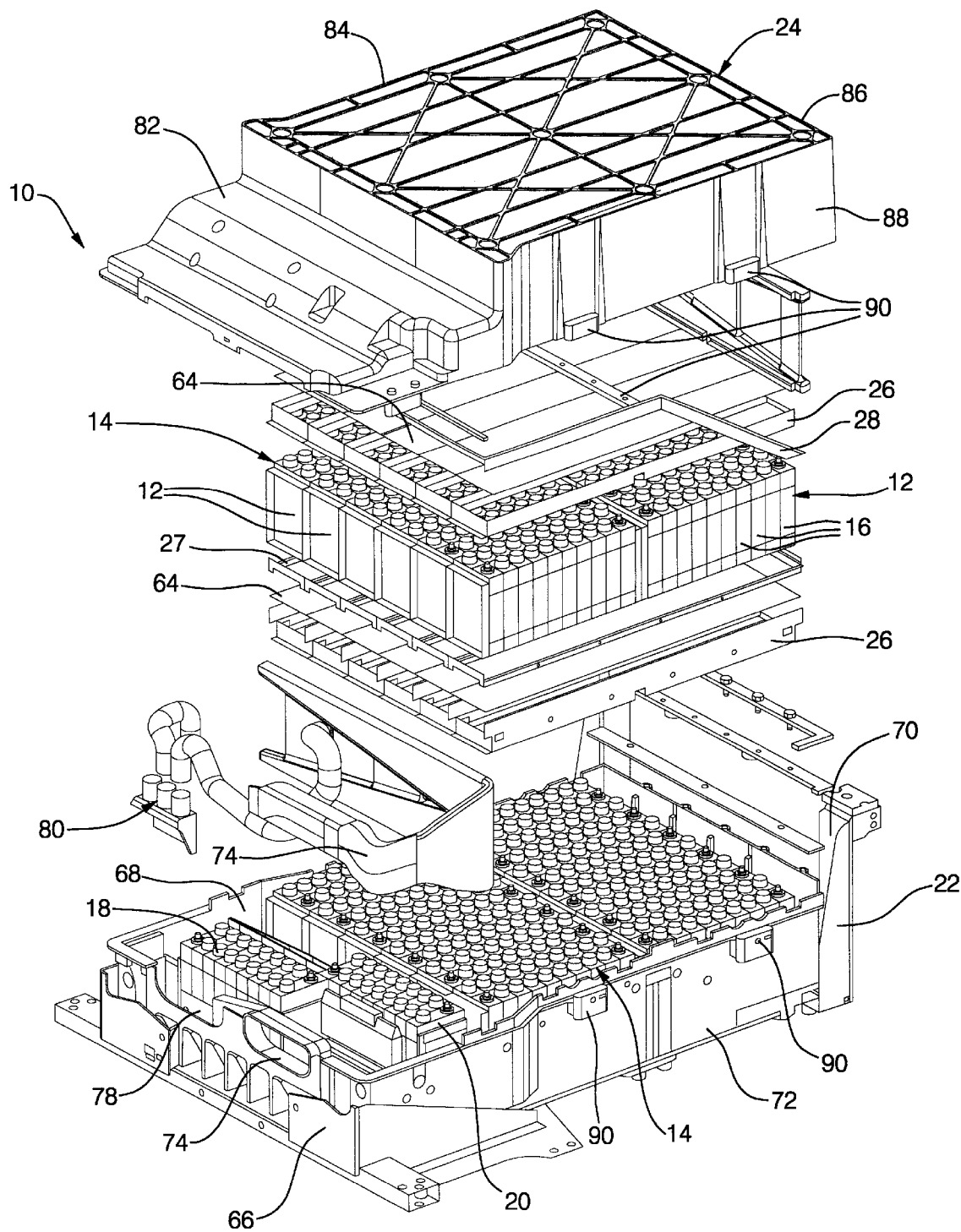
FIG. 1 is an exploded view of a battery pack in accordance with one embodiment of the present invention.

Referring now to FIG. 1 of the drawings in detail, numeral 10 generally indicates a battery pack for an electric vehicle that includes a plurality of batteries 12 electrically coupled together to provide the necessary energy/power for the vehicle's drive motor(s). The term "electric vehicle" is intended to include both "all electric" and so-called "hybrid electric" vehicles. Hybrid electric vehicles differ from "all electric" vehicles in that they also include an internal combustion engine coupled in various ways with the vehicle's electric drive system as is well known to those skilled in the art.

The batteries 12 are arranged in layers 14 stacked one atop the other and are held in an upright orientation. Each layer 14 may have six rows of batteries, each row containing two batteries. Each battery 12 is made up of a number of integral cells 16. In the particular embodiment shown in FIG. 1, two batteries 18,20 are placed in front of the battery stack because of the limited space available in the vehicle. The battery stack and the two batteries 18,20 are supported on a base 22. To completely enclose the batteries, a cover 24 overlies the batteries 12 and is secured to the base 22. Spacers 26,27 are disposed above and below each layer 14 of batteries 12 for providing a space between layers 14 of batteries 12 to allow the batteries to be stacked and to provide air passages around the batteries 12. The airflow around the batteries 12 keeps the batteries 12 at a desired temperature.

Conventionally, such batteries are typically arranged on an underlying support or tray and held down on the support by means of a cover that overlies the batteries and is secured to the underlying support. However, when using this configuration, the force applied by the cover tends to relax or decrease over time. As this force is reduced, the batteries become more susceptible to relative shifting which can reduce electrical performance of battery interconnections.

Figure 2:
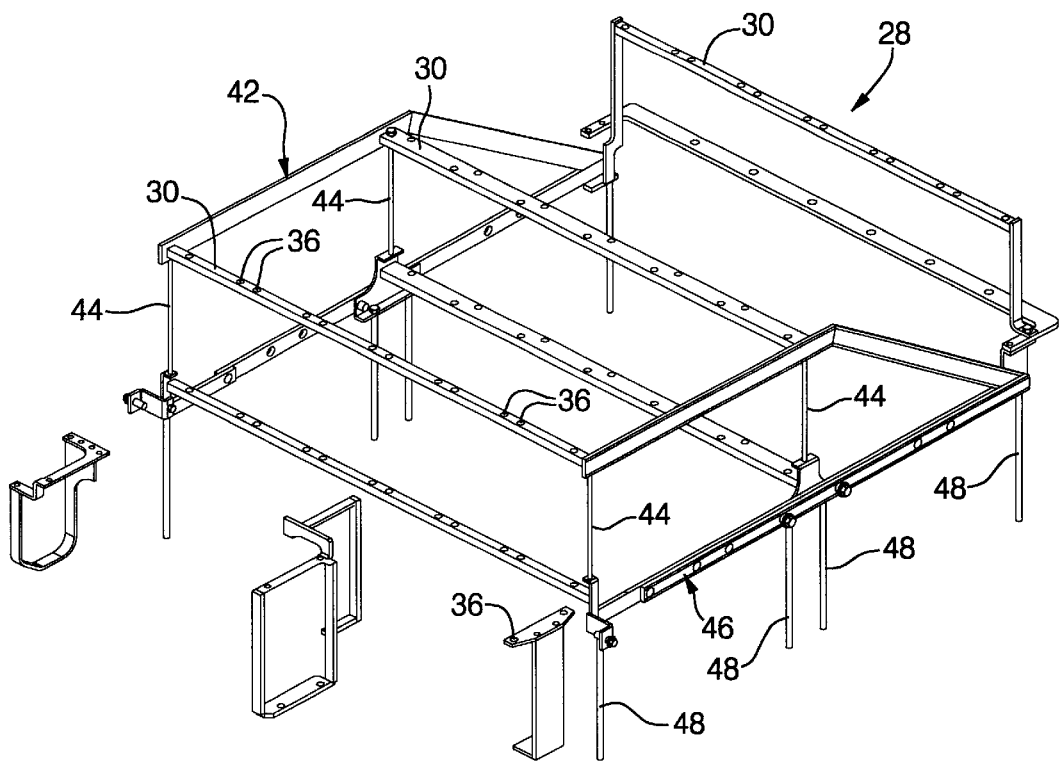
FIG. 2 is a perspective view of a retention frame used within the battery pack of FIG. 1.
Figure 3:
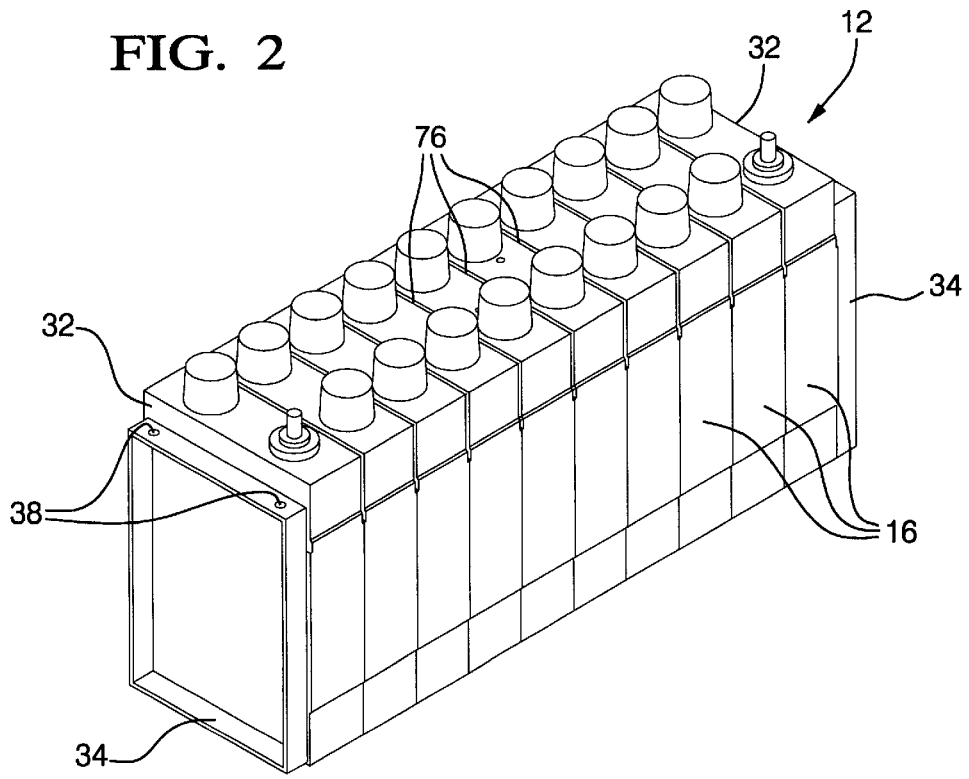
FIG. 3 is a perspective view of a battery.

In the present invention, a retention frame 28 is provided to restrict the movement of the batteries 12. Referring to FIG. 2, the frame 28 includes a plurality of beams 30 that are interconnected and extend along ends 32 of the batteries 12. In one embodiment of the invention, end brackets 34 are mounted on the ends 32 of the batteries 12 as shown in FIG. 3. The beams 30 are arranged such that they are located over the end brackets 34 of the batteries 12 when the batteries 12 are arranged in rows. The beams 30 are secured to the end brackets 34 by aligning holes 36 in the beams 30 with holes 38 in the end brackets 34 and placing fastening elements 40 such as bolts or screws through both holes 36,38 as shown in FIG. 6.

Figure 4:
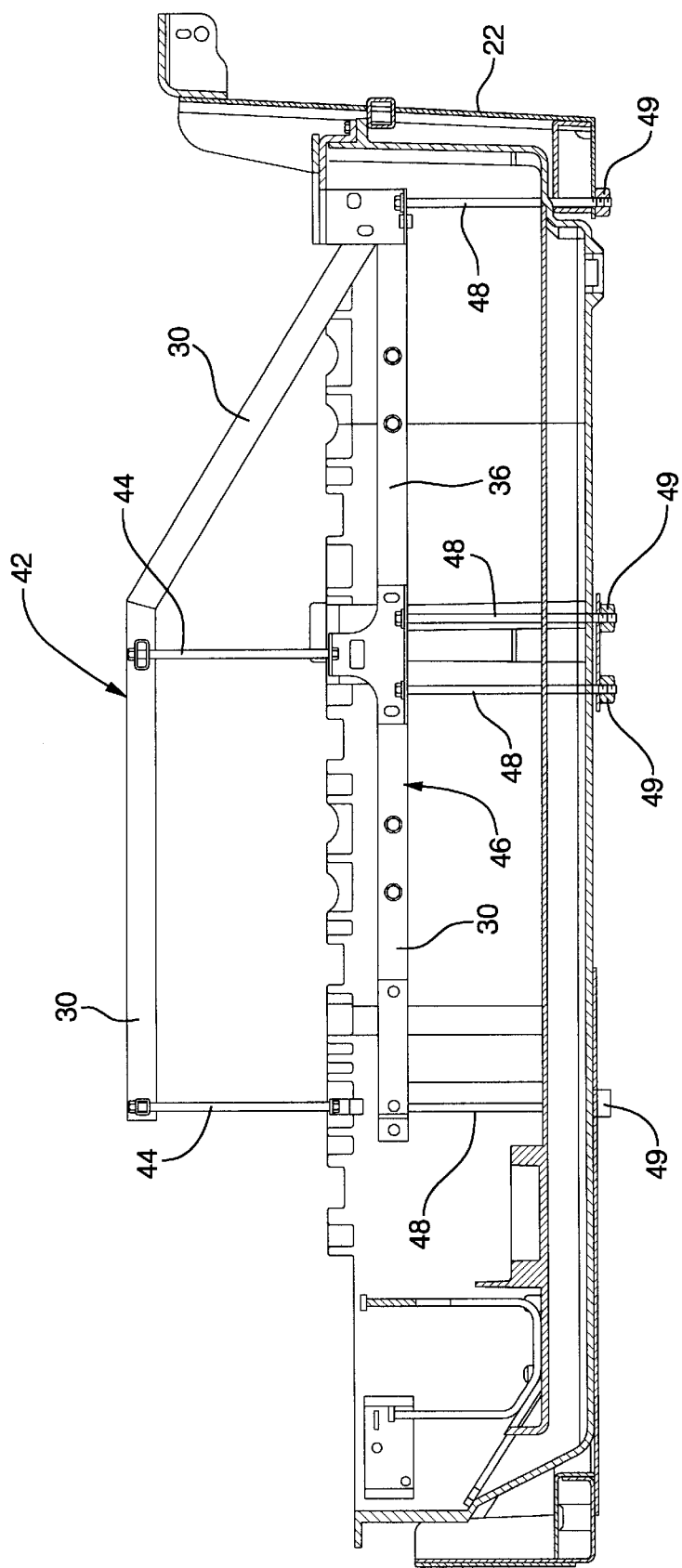
FIG. 4 is a cross-sectional view of the retention frame secured to a base of the battery pack.

The frame 28 includes a layer of beams for each layer 14 of batteries 12. An upper layer 42 is secured by fastening elements 44 to a bottom layer 46. The fastening elements 44 may be of any suitable type, for example, bolts or screws that extend between the layers 42 and 46. The bottom layer 46 of the beams is secured to the base 22 by bolts 48 and nuts 49 as shown in FIG. 4. The configuration of the frame 28 applies a vertical force against the end brackets 34 of the batteries, thereby fixing the batteries 12 rigidly to the base.

Figure 5:
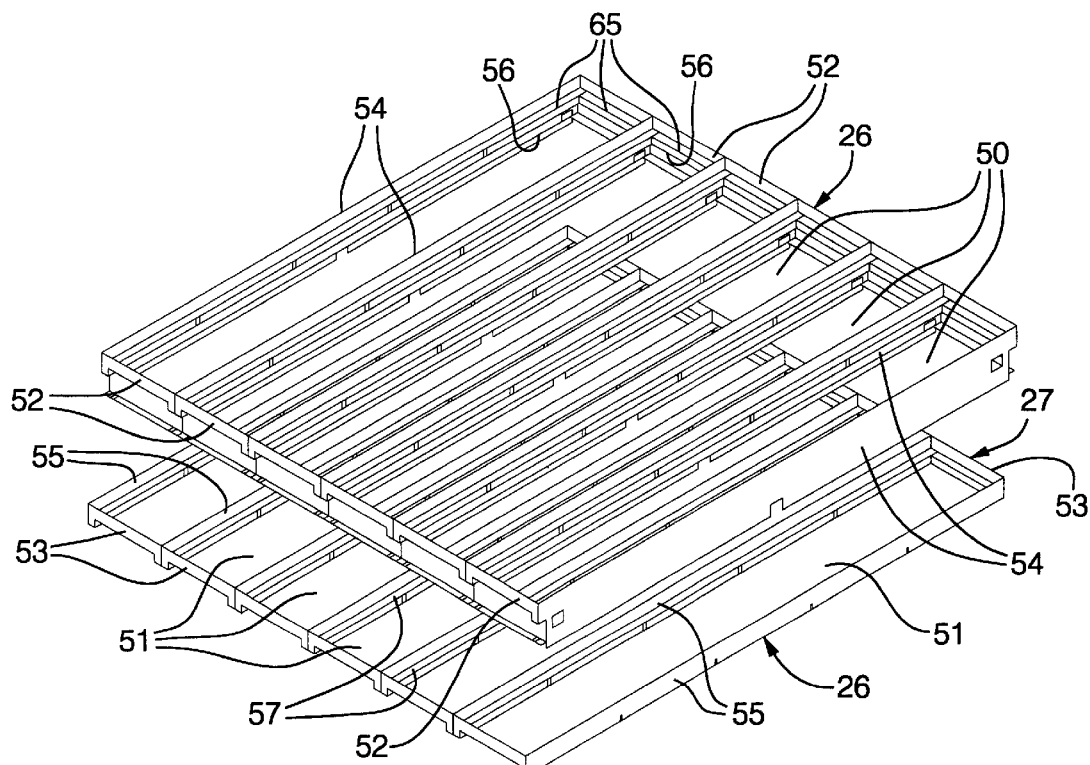
FIG. 5 is a perspective view of spacers that are located within the battery pack of FIG. 1.
Figure 6:
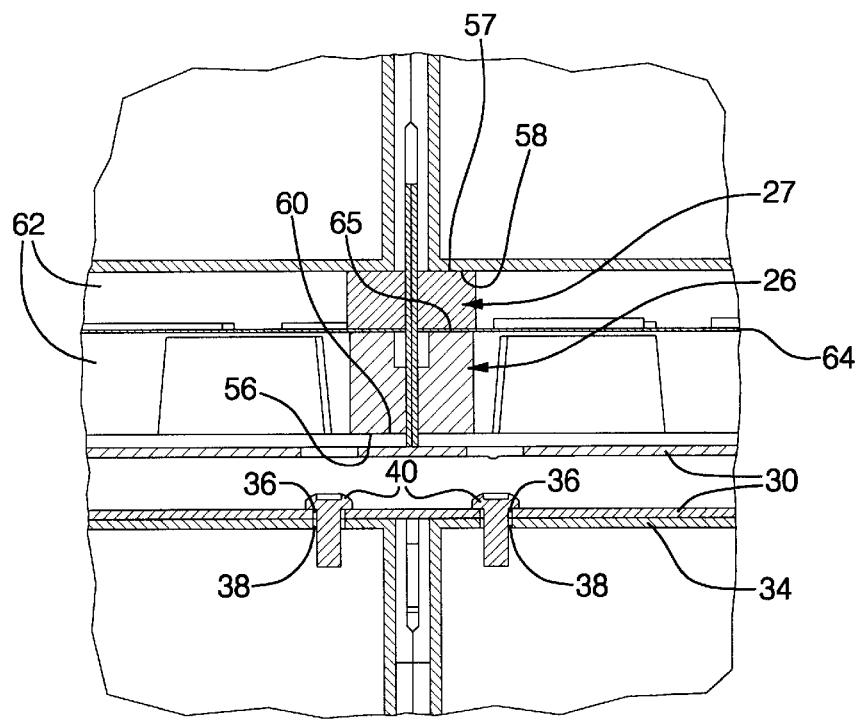
FIG. 6 is an enlarged cross-sectional view of the portion in circle 6 of FIG. 5.

Referring to FIGS. 5 and 6, the spacers 26,27 provided above and below the layers 14 of batteries 12 are divided into sections 50,51 that form the rows in which the batteries 12 are placed. Sections 50,51 include end walls 52,53 and side walls 54,55 that may be shared with an adjacent section. Horizontally disposed edge portions 56,57 extend around the inner perimeter of the walls 52,53,54,55 within sections 50,51. Bottom edges 58 of the batteries 12 are seated against upper edge portions 57 of the spacers 27 and lower edge portions 56 of spacers 26 are seated against top edges 60 of the batteries 12. A sheet of material 64 is disposed above each spacer 26 that is located above the batteries 12 to create air passages 62 above and below the batteries 12. The sheets 64 rest upon the upper edge portions 65 on the inner perimeters of the walls 52,54 of each section 50.

The base 22 of the battery pack 10 includes four walls 66,68,70,72 as shown in FIG. 1. An air inlet 74 is provided in one wall 66 that is connected to an airflow source (not shown) to provide air within the battery pack 10 to heat or cool the batteries 12 to a desired temperature. The air flows through the air passages 62 above and below each battery 12 and is also forced through vertical slots 76 (see FIG. 3) between the cells 16 of the each battery 12. The air exits the battery pack 10 though an air outlet 78 and an outlet manifold 80 controls the amount of exiting air. The cover 24 has four walls 82,84,86,88 that abut against the walls 66,68,70,72 of the base 22 when the cover 24 is placed on top of the base 22, thereby providing a completely enclosed structure for the batteries 12. The cover 24 may be secured to the base 22 by clamps 90.

While this invention has been described by reference to certain preferred embodiments, it should be understood that numerous changes could be made within the spirit and scope of the inventive concepts described. Accordingly, it is intended that the invention not be limited to the disclosed embodiments, but that it have full scope permitted by the language of the following claims.

What is claimed is:

1. A battery pack comprising:
   a plurality of batteries stacked in layers one atop the other;
   a base supporting said plurality of batteries;
   a plurality of spacers disposed above and below each layer of batteries for holding said batteries and providing air passages around said batteries to allow air flow around said batteries; and
   a retention frame affixing said batteries to said base to restrict movement of said batteries, said retention frame including a plurality of beams interconnected and extending along ends of said batteries and applying a vertical force against said batteries to hold down said batteries;
   wherein each spacer is divided into sections, each section having two end walls, two side walls and horizontally disposed upper and lower edge portions extending around the inner perimeters of said sections, wherein bottom edges of the batteries are seated against the upper edge portions when the spacers are located beneath the batteries and the lower edge portions are seated against top edges of the batteries when the spacers are located above the batteries, and a sheet of material is disposed above each spacer that is located above the batteries to define the air passages above and below the batteries.

2. A battery pack as in claim 1 wherein each battery includes end brackets mounted at each end of the battery and said retention frame is affixed to at least one of said end brackets.

3. A battery pack as in claim 2 wherein said retention frame is affixed to said end brackets by fasteners.

4. A batery pack as in claim 1 wherein each layer of batteries has a corresponding layer of beams, adjacent layers of beams are secured to each other and a bottom layer of beams is secured to the base.

5. A battery pack as in claim 4 wherein said layers of beams are secured to each other by bolts extending between layers and said bottom layer of beams is secured to the base by bolts.

* * * * *